H. SALMON.
APPARATUS FOR MANUFACTURING EXPANDED METAL.
APPLICATION FILED JUNE 15, 1912.
1,043,540. Patented Nov. 5, 1912.
2 SHEETS—SHEET 1.
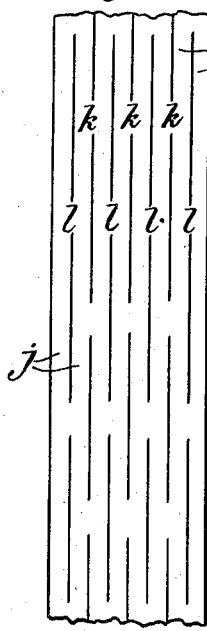
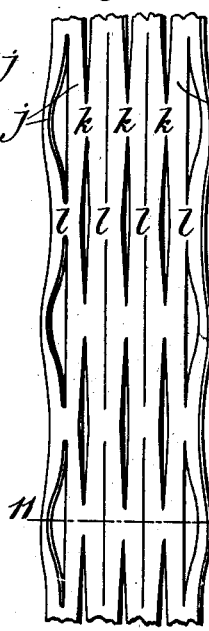
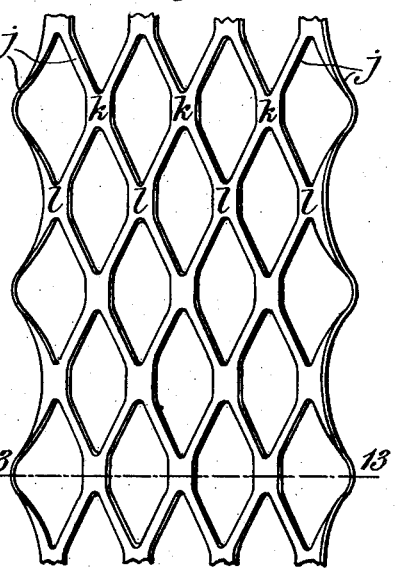
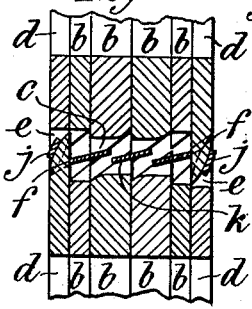
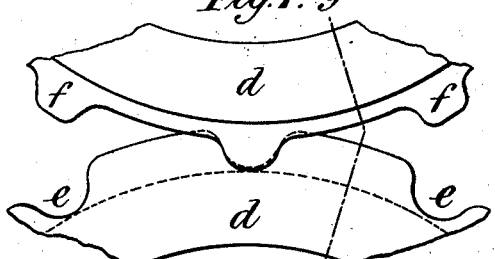
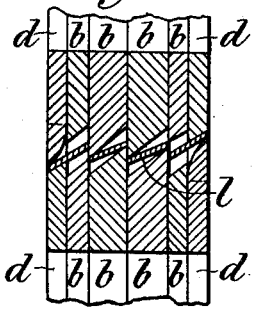
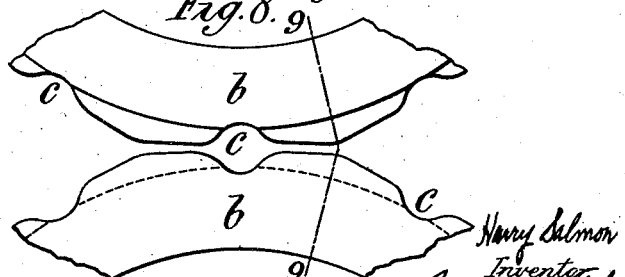

H. SALMON.
APPARATUS FOR MANUFACTURING EXPANDED METAL.
APPLICATION FILED JUNE 15, 1912.
1,043,540.
Patented Nov. 5, 1912.
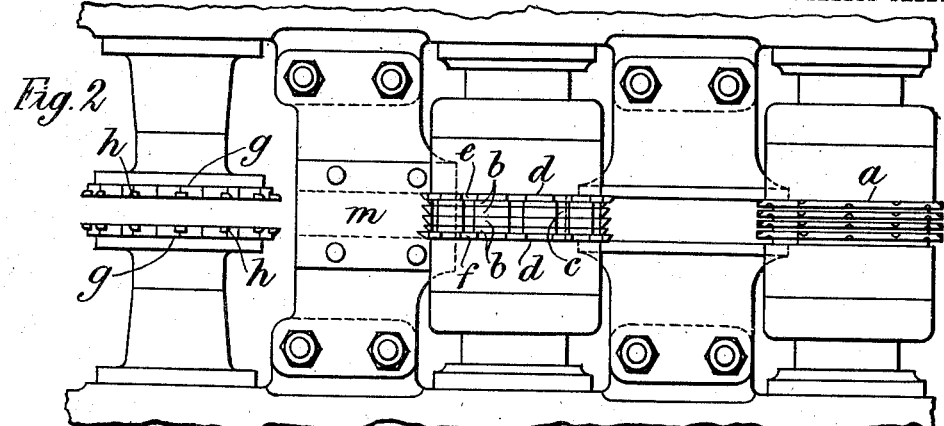
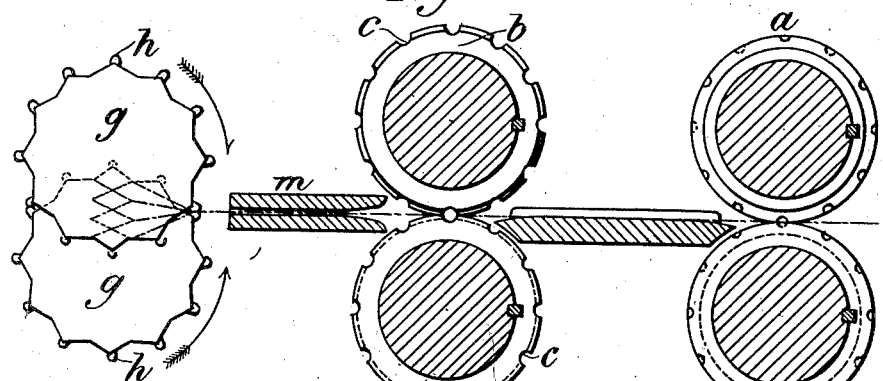
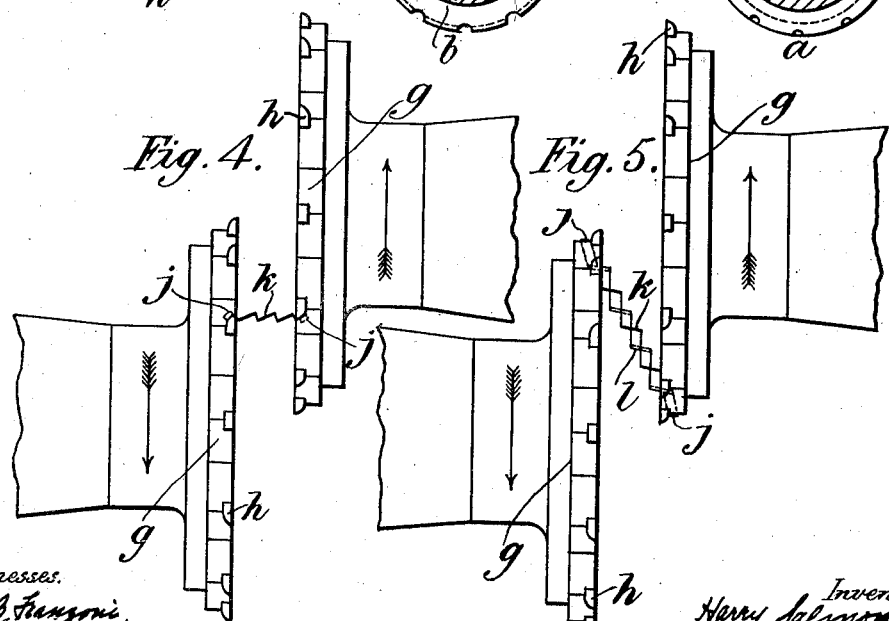

UNITED STATES PATENT OFFICE.

HARRY SALMON, OF WESTMINSTER, ENGLAND, ASSIGNOR TO THE EXPANDED METAL COMPANY, LIMITED, OF WESTMINSTER, ENGLAND.

APPARATUS FOR MANUFACTURING EXPANDED METAL.

1,043,540.      Specification of Letters Patent.      Patented Nov. 5, 1912.

Application filed June 15, 1912. Serial No. 703,949.

*To all whom it may concern:*

Be it known that I, HARRY SALMON, a subject of the King of Great Britain, residing at York Mansion, York street, in the city of Westminster, England, have invented new and useful Improvements in Apparatus for Manufacturing Expanded Metal, of which the following is a specification.

According to this invention the sheet is first slit in the ordinary way thus dividing it into parallel strips connected by junctions of uncut metal. The slit sheet is then passed through rolls by which the strips are turned in pairs in the same direction to an angle to the plane of the sheet and at the same time holes are formed at the two edges of the sheet. Finally the sheet thus prepared is expanded by means of a pair of wheels revolving in opposite directions and provided with teeth which enter the holes, the axes of such wheels being arranged one above and the other below the plane of the sheet.

The drawings show a machine arranged to deal with a slit sheet consisting of eight parallel strips but it will be understood that the machine can be readily adapted to deal with any width or thickness of sheet.

Figure 1 shows the slit sheet. Fig. 2 is a plan of the rolls and wheels and Fig. 3 is a sectional elevation of Fig. 2, the gearing for driving the rolls and wheels is well understood and is not shown. Figs. 4 and 5 are end elevations of the expanding wheels showing the positions of the sheet at the commencement and termination of the expanding operation. Fig. 6 is a longitudinal section showing to a larger scale half of each of the preparing rolls. Figs. 7 and 8 are elevations of the outer and inner portions of the rolls (Fig. 6). Fig. 9 is a section similar to Fig. 6 on the lines 9—9, Figs. 7 and 8. Fig. 10 shows the sheet after it has passed through the preparing rolls and before it has been expanded. Fig. 11 is a section on the line 11—11, Fig. 10. Fig. 12 shows the expanded sheet and Fig. 13 is a section on the line 13—13, Fig. 12.

$a$ are the slitting rolls the details of which are well known and do not require any description. Each of the preparing rolls is built up of four inner rolls $b$ (which are conical in form and have notches $c$ in them at regular intervals to receive the junctions of the slit sheet) and two outer rolls $d$. The rolls $d$ are also of conical form and the right hand lower roll, Fig. 7, has notches $e$ in it while the right hand upper roll is provided with teeth $f$ engaging with the notches. Similarly the left hand lower roll $d$ is provided with teeth $f$ and the left hand upper roll with notches $e$. The expanding wheels $g$ are irregular polygons the edges of which are parallel to their axes and have teeth $h$ projecting radially at regular intervals from their angles as shown at Figs. 3 to 5.

The method of operation is as follows:—A sheet of metal is passed through the rolls $a$ and is slit as shown at Fig. 1 being divided into parallel strips $j$ connected by junctions $k$ and $l$, there being three junctions $k$ in a row and four junctions $l$. The slit sheet travels on to the preparing rolls and in passing through them the junctions $k$ are received in the notches $c$ and are not materially acted on but the two strips $j$ at the sides of these junctions are bent almost at right angles to the sheet by the teeth $f$ as shown at Figs. 6 and 11. The junctions $l$ are acted on by the conical part of the rolls $b$ and are turned to an angle to the plane of the sheet as shown at Fig. 9. The sheet thus prepared passes through the guide $m$, Fig. 3, on to the wheels $g$, the teeth $h$ of which enter the holes formed as above described between the turned up outer strips $j$ and the junctions $k$ the outer strips $j$ themselves lying more or less flatly on the flat edges of the polygonal wheels. These wheels revolve in opposite directions as shown by the arrows (Figs. 3, 4 and 5) so that the sheet (the edges of which are taken hold of by the teeth when it is in a horizontal position Fig. 4) is tilted and expanded the expansion being completed as each tooth comes vertically above or below the axis of its wheel (as the case may be) as shown at Fig. 5. The continued revolution of the wheels frees the teeth from the edges of the expanded sheet.

What I claim is:—

1. The combination of means for slitting a sheet of metal into parallel strips connected by junctions of uncut metal, means for turning the inside strips of the slit sheet in pairs to an angle to the plane of the sheet, means for separating the portions of the two edge strips between the junctions from the adjacent strips thus forming holes in the edges of the sheet, a pair of wheels revolving in opposite directions, and teeth on the wheels engaging with the holes in the sheet.

2. The combination of means for slitting a sheet of metal, means for turning the inside strips of the slit sheet in pairs to an angle to the plane of the sheet, means for separating the portions of the two edge strips between the junctions from the adjacent strips thus bending the portions of the strips at the edges of the sheet between the junctions approximately at right angles to the plane of the sheet thus forming holes in the edges of the sheet, a pair of wheels revolving in opposite directions, and teeth on the wheels engaging with the holes at the edges of the sheet.

3. A roll for preparing a slit sheet for expanding, consisting of a number of conical rolls each with notches in it at regular intervals around its circumference, and having at one end a roll armed with teeth projecting from it at similar intervals in combination with a coöperating roll and means for operating said roll.

4. A wheel for expanding metal having its edge parallel to its axis, and having teeth projecting radially from one side of its edge at regular intervals around its circumference in combination with a coöperating wheel and means for operating said wheel.

5. The combination of means for slitting a sheet of metal, a pair of preparing rolls each consisting of a number of conical rolls each with notches in it at regular intervals around its circumference and having at one end a roll armed with teeth projecting from it at similar intervals the teeth of one end roll engaging with the notches of the other end roll and a pair of expanding wheels each having its edge parallel to its axis and having teeth projecting radially from one side of its edge at regular intervals around its circumference.

HARRY SALMON.

Witnesses:
T. HARRY TILLY, Jr.,
JAS. T. NICHOLSON.